(12) United States Patent
Waldron et al.

(10) Patent No.: US 11,032,087 B2
(45) Date of Patent: Jun. 8, 2021

(54) CERTIFICATE ANALYSIS

(71) Applicant: HEWLETT-PACKARD DEVELOPMENT COMPANY, L.P., Houston, TX (US)

(72) Inventors: James R Waldron, Houston, TX (US); Vali Ali, Houston, TX (US); Boris Balacheff, Boulogne-Billancourt (FR)

(73) Assignee: Hewlett-Packard Development Company, L.P., Spring, TX (US)

( * ) Notice: Subject to any disclaimer, the term of this patent is extended or adjusted under 35 U.S.C. 154(b) by 125 days.

(21) Appl. No.: 15/747,242

(22) PCT Filed: Sep. 30, 2015

(86) PCT No.: PCT/US2015/053092
§ 371 (c)(1),
(2) Date: Jan. 24, 2018

(87) PCT Pub. No.: WO2017/058186
PCT Pub. Date: Apr. 6, 2017

(65) Prior Publication Data
US 2018/0219689 A1    Aug. 2, 2018

(51) Int. Cl.
*H04L 9/32* (2006.01)
*H04L 9/08* (2006.01)
*H04L 29/06* (2006.01)

(52) U.S. Cl.
CPC .......... *H04L 9/3265* (2013.01); *H04L 9/0891* (2013.01); *H04L 9/0894* (2013.01); *H04L 63/0272* (2013.01); *H04L 63/0823* (2013.01); *H04L 2209/38* (2013.01)

(58) Field of Classification Search
CPC ... H04L 9/3265; H04L 9/0894; H04L 9/0891; H04L 63/0823; H04L 63/0272; H04L 2209/38
USPC ........................................................ 713/157
See application file for complete search history.

(56) References Cited

U.S. PATENT DOCUMENTS

| | | | |
|---|---|---|---|
| 7,634,811 B1 | 12/2009 | Kienzle et al. | |
| 7,962,742 B2 | 6/2011 | Schwarz et al. | |
| 8,869,259 B1 | 10/2014 | Udupa et al. | |
| 2002/0029200 A1* | 3/2002 | Dulin | G06F 21/33 705/67 |

(Continued)

FOREIGN PATENT DOCUMENTS

| JP | 2010015263 A | 1/2010 |
|---|---|---|
| WO | WO-2014/092702 A1 | 6/2014 |

OTHER PUBLICATIONS

Martin Georgiev et al., "The Most Dangerous Code in the World: Validating SSL Certificates in Non-browser Software," CCS'12, Oct. 16-18, 2012, Raleigh, North Carolina, USA. pp. 1-12. ACM.

(Continued)

*Primary Examiner* — Kambiz Zand
*Assistant Examiner* — Aubrey H Wyszynski
(74) *Attorney, Agent, or Firm* — HPI Patent Department

(57) ABSTRACT

Examples associated with certificate analysis are disclosed. One example periodically analyzing a secure socket layer certificate chain between a client device and a server device. The client device may perform this periodic analysis. In response to detecting an unexpected certificate in the secure socket layer certificate chain, a responsive action is taken.

14 Claims, 7 Drawing Sheets

(56) References Cited

U.S. PATENT DOCUMENTS

| | | | |
|---|---|---|---|
| 2003/0041110 A1* | 2/2003 | Wenocur | H04L 63/12 |
| | | | 709/206 |
| 2008/0155691 A1* | 6/2008 | Fossen | G06F 21/562 |
| | | | 726/22 |
| 2008/0288790 A1* | 11/2008 | Wilson | G06Q 20/4014 |
| | | | 713/194 |
| 2008/0307219 A1 | 12/2008 | Karandikar | |
| 2009/0070582 A1* | 3/2009 | Aura | H04L 63/0823 |
| | | | 713/168 |
| 2009/0240717 A1* | 9/2009 | Mimatsu | G06F 11/0727 |
| 2011/0154021 A1 | 6/2011 | McCann et al. | |
| 2014/0075185 A1 | 3/2014 | Dragomir et al. | |
| 2014/0195800 A1 | 7/2014 | Sabin et al. | |
| 2016/0344725 A1* | 11/2016 | Severin | H04L 63/0442 |

OTHER PUBLICATIONS

Nick Sullivan, "Introducing Strict SSL: Protecting Against a Man-in-the-middle Attack on Origin Traffic," Feb. 14, 2014, pp. 1-15, blog.cloudflare.com.

* cited by examiner

CERTIFICATE ANALYSIS

BACKGROUND

To prevent undesirable monitoring and modification of transmissions between systems, clients, and so forth, various encryption techniques are employed. One technique involves using hypertext transfer protocol secure (HTTPS). HTTPS seeks to encrypt data over the secure socket layer to protect privacy and integrity of the data. This encryption is achieved based on certificates from trusted authorities that ensure that data encrypted based on the certificates cannot be compromised. If a certificate becomes compromised, that certificate is revoked so that a different certificate will be used instead.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Systems, methods, and equivalents associated with certificate analysis are described. As discussed above, secure socket layer level encryption may be used to ensure that certain types of connections cannot be monitored or manipulated by actors attempting to attack the connection. However, certain man-in-the-middle attacks may be possible by manipulating a certificate chain that protects a connection. By way of illustration, someone interested in snooping on contents of a connection between a client and a server in communication with the client may be able to insert a certificate in the certificate chain that allows that someone to view messages passed along that connection.

Notably, these types of man-in-the-middle attacks may come from otherwise integral parties to the connection between the client and the server, and not just from, for example, hackers hoping to steal or modify data between the client and the server. By way of illustration, an internet service provider may be interested in viewing what types of content is passing through their network to, for example, optimize connections for that type of traffic, prohibit certain types of content, and so forth. However, parties with, for example, confidential information, may not be able to tolerate examination of that confidential information by the internet service provider.

To prevent this access, certificate analysis may be performed by a client system to determine whether a man-in-the-middle has been manipulating the certificate chain between the client system and a server system communicating with the client system. This certificate analysis may be periodically performed to analyze certificate chains of a connection between the client system and the server system over the lifetime of the connection. If an unexpected certificate is detected in the certificate chain, an action may be taken to prevent undesirable access to contents of communications between the client system and the server system. The action may include further securing the connection, disabling the connection, and so forth. In some examples, the unexpected certificate may be a result of an alternative network path being taken between the client system and the server system. In this example, the unexpected certificate may be whitelisted so that communication between the client and server remains uninterrupted over this new connection.

Figure 1:
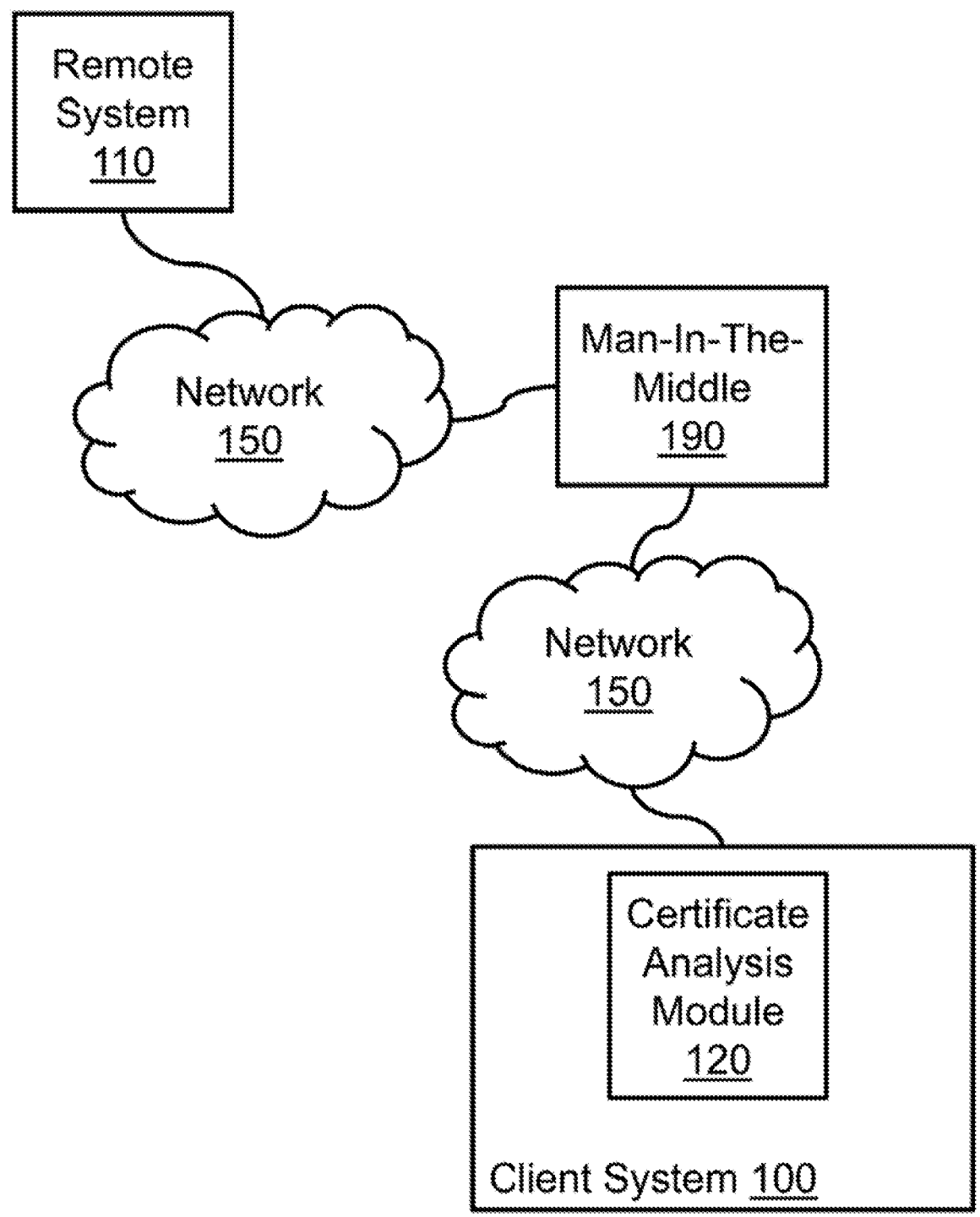
FIG. 1 illustrates an example client system associated with certificate analysis.

FIG. 1 illustrates an example interface associated with certificate analysis. It should be appreciated that the items depicted in FIG. 1 are illustrative examples and many different devices, and so forth may operate in accordance with various examples.

FIG. 1 illustrates an example client system 100 associated with certificate analysis. Client system 100 is connected to a remote system 110 via various networks 150. In between networks 150, is a man-in-the-middle 190. Networks may include, for example, internal networks, service provider networks, the Internet, and so forth. Though an example is illustrated where networks 150 connect client system 100 and remote system 110, in other examples, it is possible that man-in-the-middle 190 connects directly to one or both of client system 100 and server system 110.

In this example, man-in-the-middle 190 may be a necessary connection on the path between client system 100 and remote system 110. This may occur, when, for example, man-in-the-middle 190 provides some service for one or more of, client system 100, remote system 110, a network 150, and so forth. In other examples, man-in-the-middle may be an adversary whose primary goal is to interfere with connections between client system 100 and remote system 110 by, for example, reading or manipulating information passed over connections between client system 100 and remote system 110.

To prevent attacks from man-in-the-middle 190 that may interfere with communications, client system 100 and remote system 110 may employ secure socket layer security techniques to prevent manipulation or undesirable access to the communications. These techniques may rely on, for example, public key cryptography techniques that use digital certificates to sign and/or encrypt messages to prevent improper modification, access, and to ensure that recipients of messages can be certain the originator of the message is actually who they claim to be.

Certificates may be issued by certificate authorities who are trusted third parties that certify ownership of various keys. Certificate authorities issue certificates in two categories, root certificates and intermediate certificates. Root certificates may be unsigned or self-signed certificates that are carefully protected by the root authority. Root certificates are then used to sign intermediary certificates which may then sign other intermediary certificates until a certificate being used to secure communications between two parties has been signed. This chain of trust is used to handle cases where a certificate has become compromised. If a certificate is compromised, all certificates signed by that certificate may also be considered compromised and will be revoked so that new certificates will be obtained to re-secure communications. This may in turn causes further subsidiary certificates to be revoked, and so forth. Consequently, root certificates are used on a limited basis to prevent cases where entire swaths of certificates must be revoked due to the root certificate being compromised.

In certain cases however, certificates may be added to the chain of trust that allow a man-in-the-middle to read and/or manipulate data being communicated despite using secure socket layer communication. This may occur when, for example, certain undesirable applications are installed on machines or within the communication paths between, for examples, clients and servers.

Though these applications may be detectable using, for example, antivirus software, antivirus techniques may be a reactive approach that will not detect the undesirable applications until these applications have been specifically identified as some type of malware. Further, in cases where man-in-the-middle attacks are not related to a specific application (e.g., a bad actor controlling a wireless access point), an antivirus application may be unable to detect an inserted certificate. Though some approaches may attempt to perform certain types of certificate analysis on servers instead of clients (e.g., remote system 110), these approaches may be ineffective if the man-in-the-middle is able to hide its existence from the server by, for example, manipulating communications in transit between client system 100 and remote system 110.

Consequently, a certificate analysis module 120 running on client system 100 may periodically analyze a certificate chain associated with a connection between client system 100 and remote system 110, in addition to other attributes, to determine whether that connection has become compromised. For example, upon establishing a connection between client system 100 and remote system 110, various attributes of the connection may be stored in client system 100. These connection attributes may include an initial state of a certificate chain between client system 100 and remote system 110. As client system 100 and remote system 110 communicate, certificate analysis module 120 may periodically compare attributes of the connection to the previously stored connection attributes. This periodic analysis may occur, for example, at fixed intervals, in association with a specific repetitive event (e.g., client system 100 connecting to remote system 110 to check for a status or pending actions), upon detecting a modification to an attribute of the connection between client system 100 and remote system 110, and so forth.

When certificate analysis module 120 detects a difference between a current connection state and a previous connection state, certificate analysis module 120 may then take a remedial action. The difference may be, for example, an unexpected certificate in the certificate chain that does not match the initial state of the certificate chain. Other attributes of the connection between client system 100 and remote system 110 may also be monitored.

Remedial actions may vary depending on the circumstances. In some situations it may be appropriate to notify a user of the potentially compromised connection. In this scenario the user may be provided with additional information about the unexpected certificate or connection attribute. The user may then be allowed to make a decision about how to proceed. In other examples, certificate analysis module 120 may take further action without user input. If it is important that the connection between client system 100 and remote system 110 remain secure, actions may be taken to secure the connection beyond the protections offered by secure socket layer encryption. By way of illustration, the connection may be further encrypted, a different type of secure connection may be established between client system 100 and remote system 110 (e.g., a virtual private network). In some cases, it may be desirable to disable the connection until a more secure location can be reached or a more secure connection can be established.

In other cases, the change in the certificate chain may be a result of communications between client system 100 and remote system 110 taking a different connection path through networks 150. In this scenario, it may be desirable to, for example, whitelist these changes to the connection by storing them so that future analysis of the connection that complies with these connection attributes does not otherwise interrupt use of the connection.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
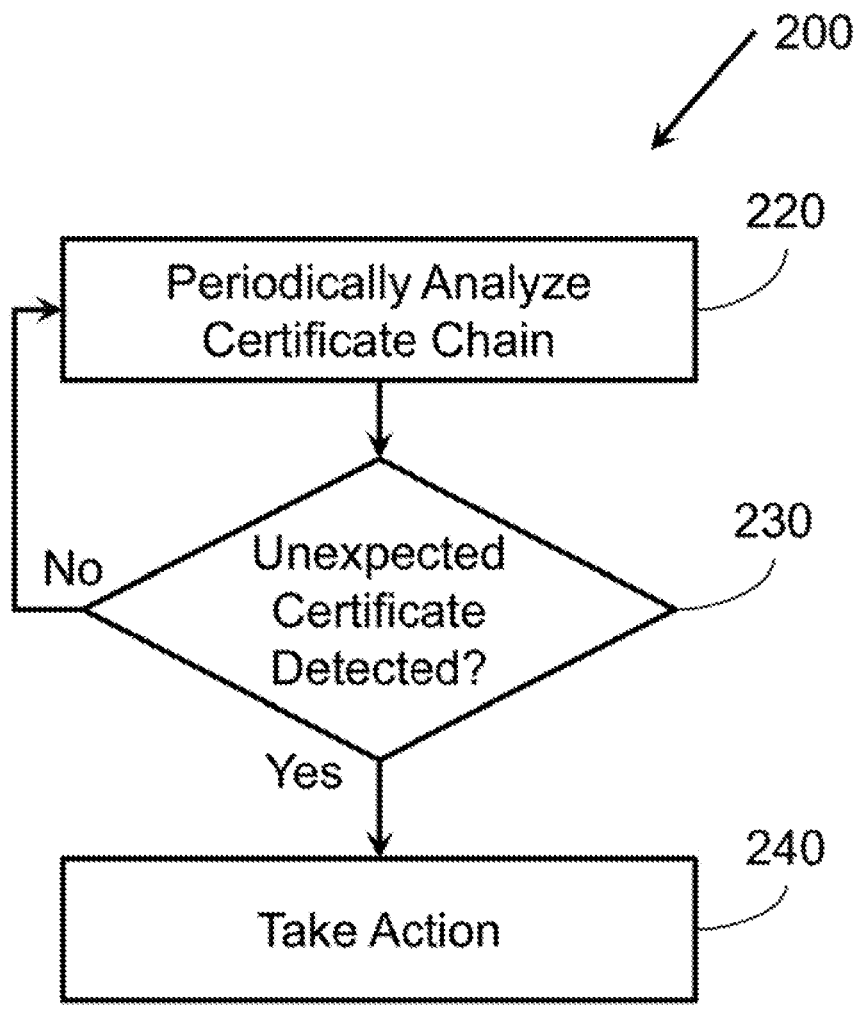
FIG. 2 illustrates a flowchart of example operations associated with certificate analysis.

FIG. 2 illustrates an example method 200 associated with certificate analysis. Method 200 may be embodied on a non-transitory computer-readable medium storing processor-executable instructions. The instructions, when executed by a processor, may cause the processor to perform method 200. In other examples, method 200 may exist within logic gates and/or RAM of an application specific integrated circuit (ASIC).

Method 200 includes periodically analyzing a secure socket layer certificate chain at 220. A client device may perform the analysis of the secure socket layer certificate chain at 220. The secure socket layer certificate chain may be a chain that protects communications between the client device and a server device. The periodic analysis may occur during, for example, a periodic check-in by the client device to the server device, a modification to the secure socket layer certificate chain, a modification to a known safe certificate chain, and so forth.

Method 200 also includes determining whether an unexpected certificate has been found within the secure socket layer certificate chain at 230. When no unexpected certificates are found, method 200 may proceed back to action 220 and continue periodically analyzing the secure socket layer certificate chain. In various examples, an unexpected certificate may be a certificate that has not been identified in the secure socket layer certificate chain previously, and that is not an otherwise whitelisted certificate (e.g., by a known trusted certificate authority).

Consequently, when an unexpected certificate is detected at 230, method 200 may proceed to action 240 and take an action responsive to the unexpected certificate being found in the secure socket layer certificate chain. In some examples, the action may include enabling a virtual private network between the client device and the server device, initiating some other form of data protection between the client device and the server device, breaking the connection between the client device and the server device, storing the secure socket layer certificate chain as a known safe certificate chain, and so forth.

In some examples, the action may include providing information associated with the unexpected certificate to a user. This may allow the user to make a decision to cause some other responsive action to be performed. By way of illustration, if, after reviewing a message regarding the unexpected certificate, the user determines that the certificate may compromise data security between the client device and the server device, the user may cause further actions to be taken to secure the connection, terminate the connection until the connection can be secured, and so forth. If the user believes the unexpected certificate will not compromise data security, the user may cause this certificate chain to be ignored, treated as a known safe certificate chain, and so forth, and continue using the connection between the client device and the server device.

Figure 3:
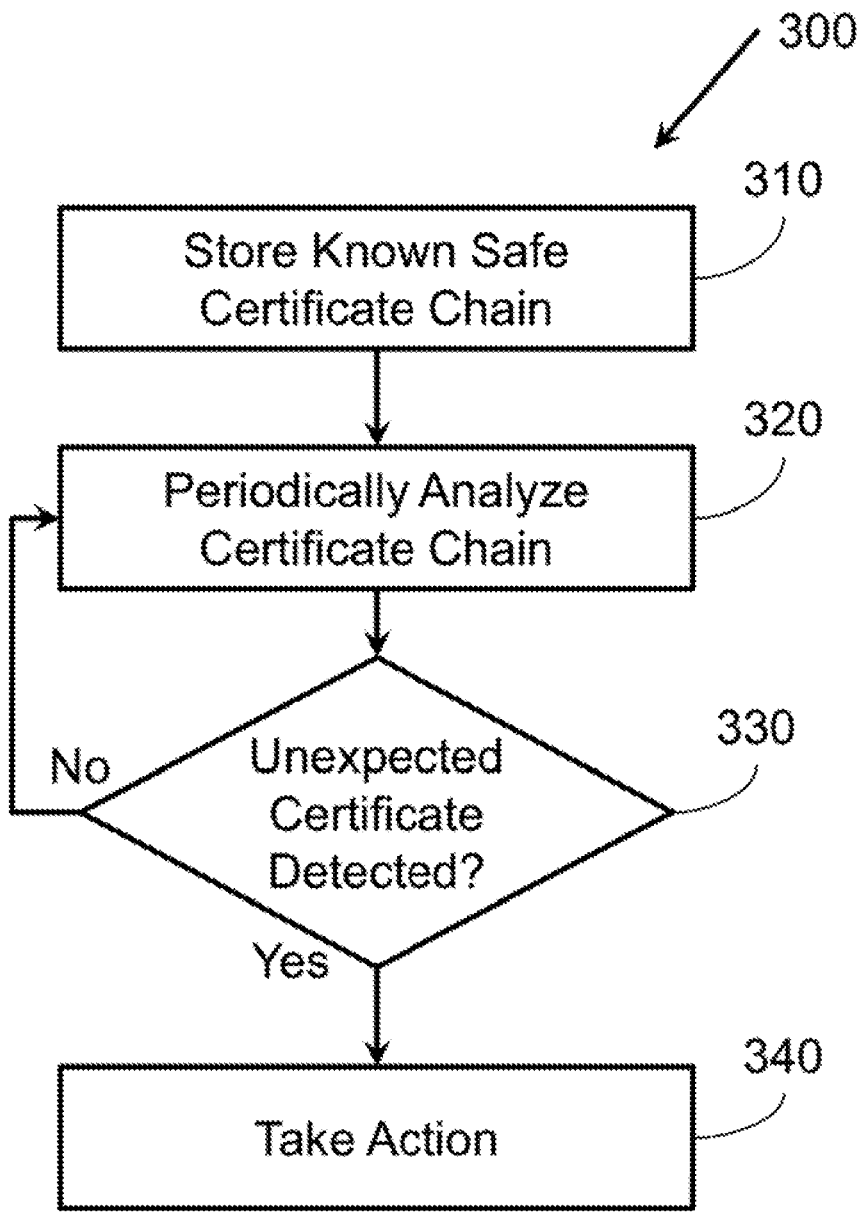
FIG. 3 illustrates another flowchart of example operations associated with certificate analysis.

FIG. 3 illustrates a method 300 associated with certificate analysis. Method 300 includes several actions similar to those described above with reference to method 200 (FIG. 2). For example, method 300 includes periodically analyzing a secure socket layer certificate chain at 320, determining whether an unexpected certificate has been detected in the certificate chain at 330, and taking a responsive action at 340.

Method 300 also includes storing a known safe certificate chain at 310. The known safe certificate chain may be a certificate chain between the client device and the server device. In this example, analyzing the secure socket layer certificate chain at 320 may include comparing the secure socket layer certificate chain to the known safe certificate chain. In various examples, the known safe certificate chain may be stored, for example, during initiation of a connection between the client device and the server device, based on a prior connection between the client device and a server device, during an installation of an application on the client device, and so forth.

Figure 4:
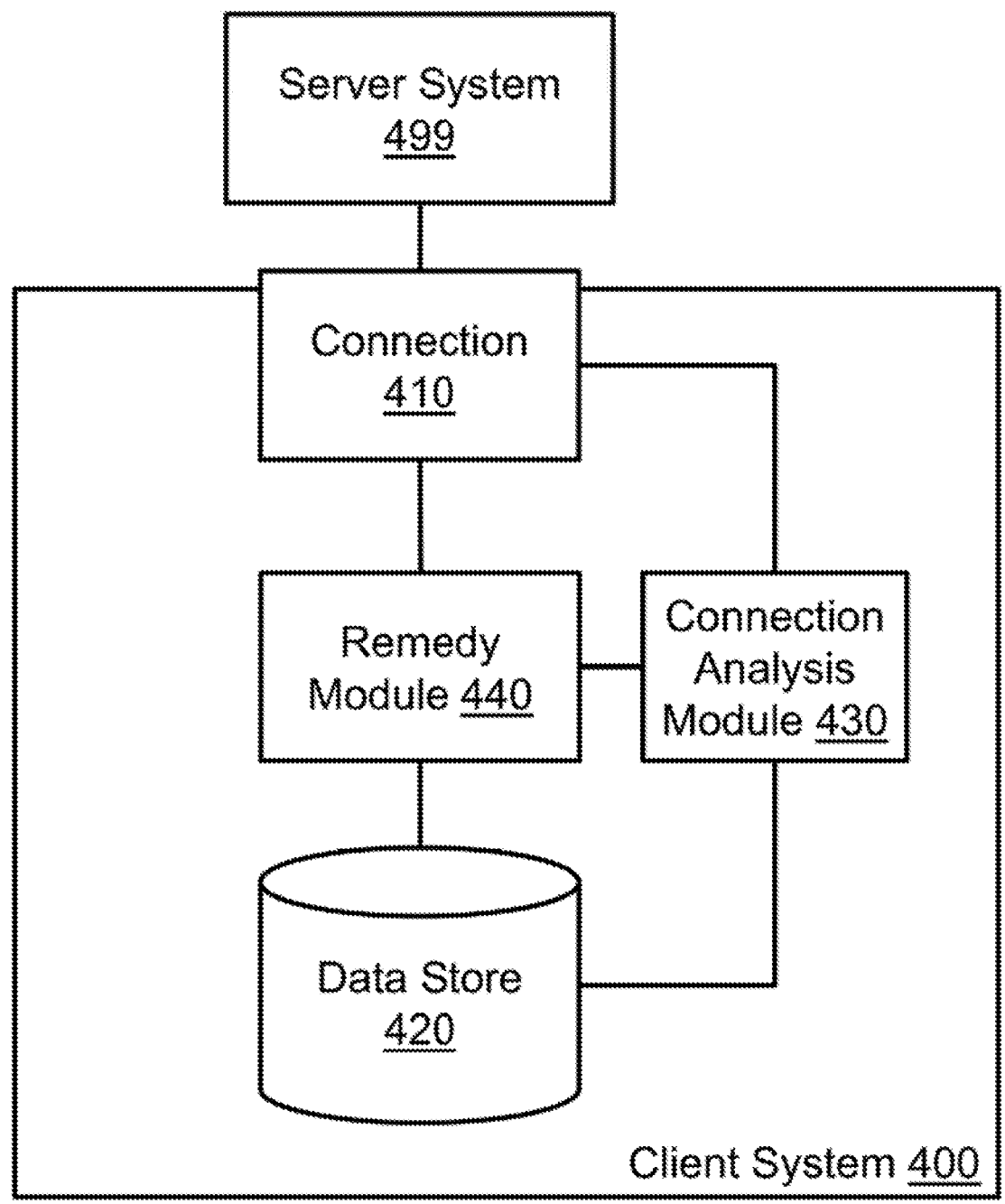
FIG. 4 illustrates an example client system associated with certificate analysis.

FIG. 4 illustrates a client system 400 associated with certificate analysis. Client system 400 includes a data store 420. Data store 420 may store a set of known safe connection attributes. The connection attributes may be associated with a connection 410 between client system 400 and a server system 499. Thus, client system 400 and server system 499 may be in communication with one another. Server system 499 may be, for example, a client management system, a cloud-based software as a service system, a data storage system, and internal network, and so forth. The set of known safe connection attributes stored in data store 420 may include a known safe certificate chain.

Client system 400 also includes a connection analysis module 430. Connection analysis module 430 may compare connection attributes of connection 410 to the set of known safe connection attributes in data store 420. The connection analysis module may perform this comparison at periodic intervals, after certain events, and so forth.

Client system 400 also includes a remedy module 440. Remedy module 440 may cause client system 400 to take a remedial action when connection analysis module 430 detects an unexpected certificate in a certificate chain associated with connection 410. In some examples, the unexpected certificate may be a certificate absent from the known safe certificate chain. In other examples, remedy module may take the remedial action when connection analysis module 430 detects that connection 410 has some other attribute that falls outside the set of known safe connection attributes stored in data store 420.

In various examples, the remedial action may include one or more of, alerting a user, performing a user directed action in response to a user input, terminating connection 410, securing connection 410, modifying the set of known safe connection attributes in data store 420, and so forth.

Figure 5:
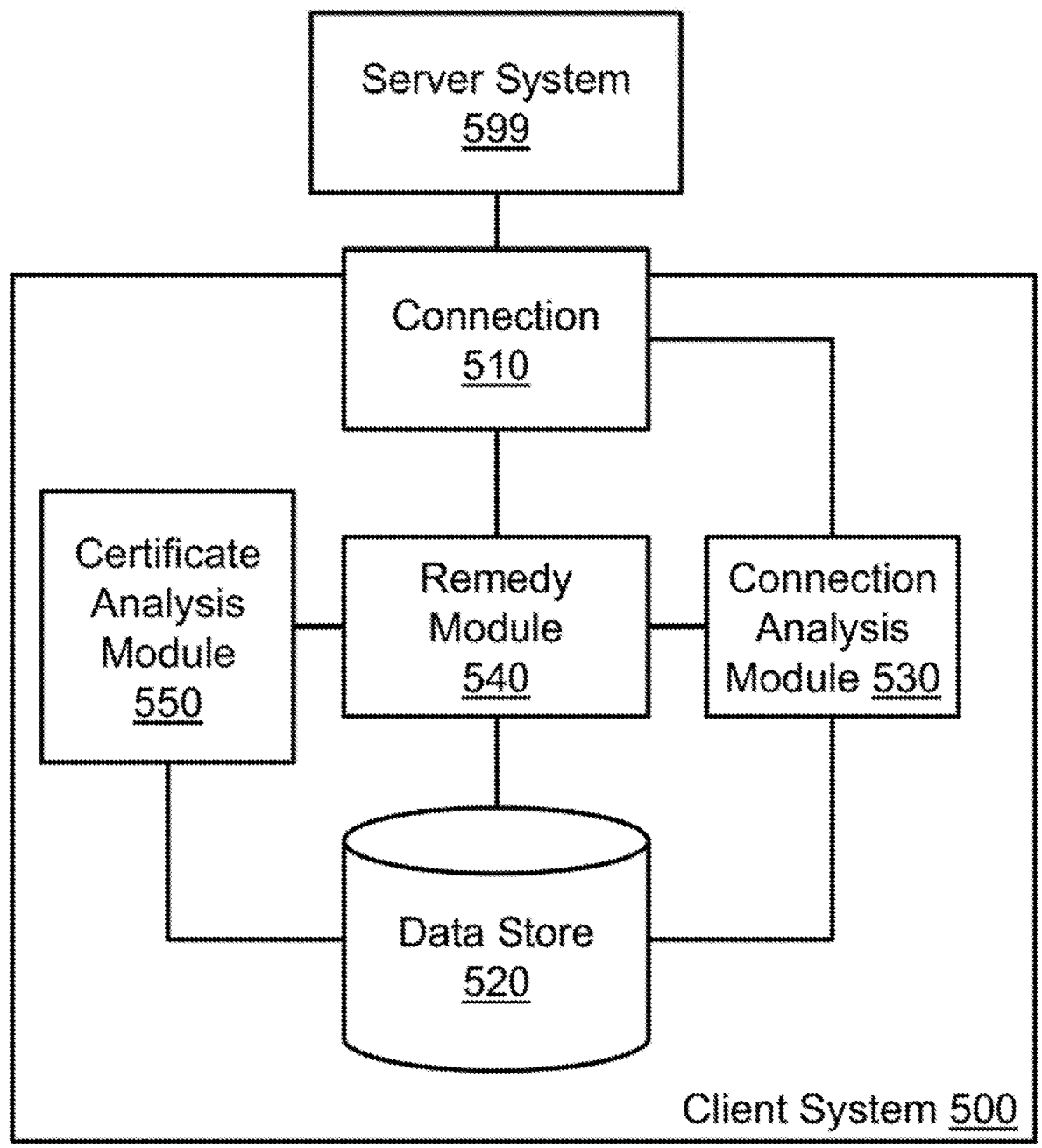
FIG. 5 illustrates another example client system associated with certificate analysis.

FIG. 5 illustrates a client system 500 associated with certificate analysis. System 500 includes several items similar to those described above with reference to system 400 (FIG. 4). For example, client system 500 includes a data store 520 storing a set of known safe connection attributes associated with a connection 510 between client system 500 and a server system 599. Client system 500 also includes a connection analysis module 530, and a remedy module 540.

System 500 also includes a certificate analysis module 550. Certificate analysis module 550 may monitor changes to data store 520. In this example remedy module 540 may take a remedial action when certificate analysis module 550 detects a suspicious certificate in data store 520. In various examples, the suspicious certificate may be detected based on, for example, a list of known suspicious certificates, a heuristic property evaluation, and so forth. A heuristic property evaluation may examine circumstances around which the suspicious certificate appeared in data store 520 and determine whether to take action based on whether, based on these circumstances, it is likely that the certificate is from a trusted or untrusted source. Consequently, certificate analysis module 550 may monitor changes being made to data store 520 to prevent unauthorized tampering with which certificates chains are considered safe.

Figure 6:
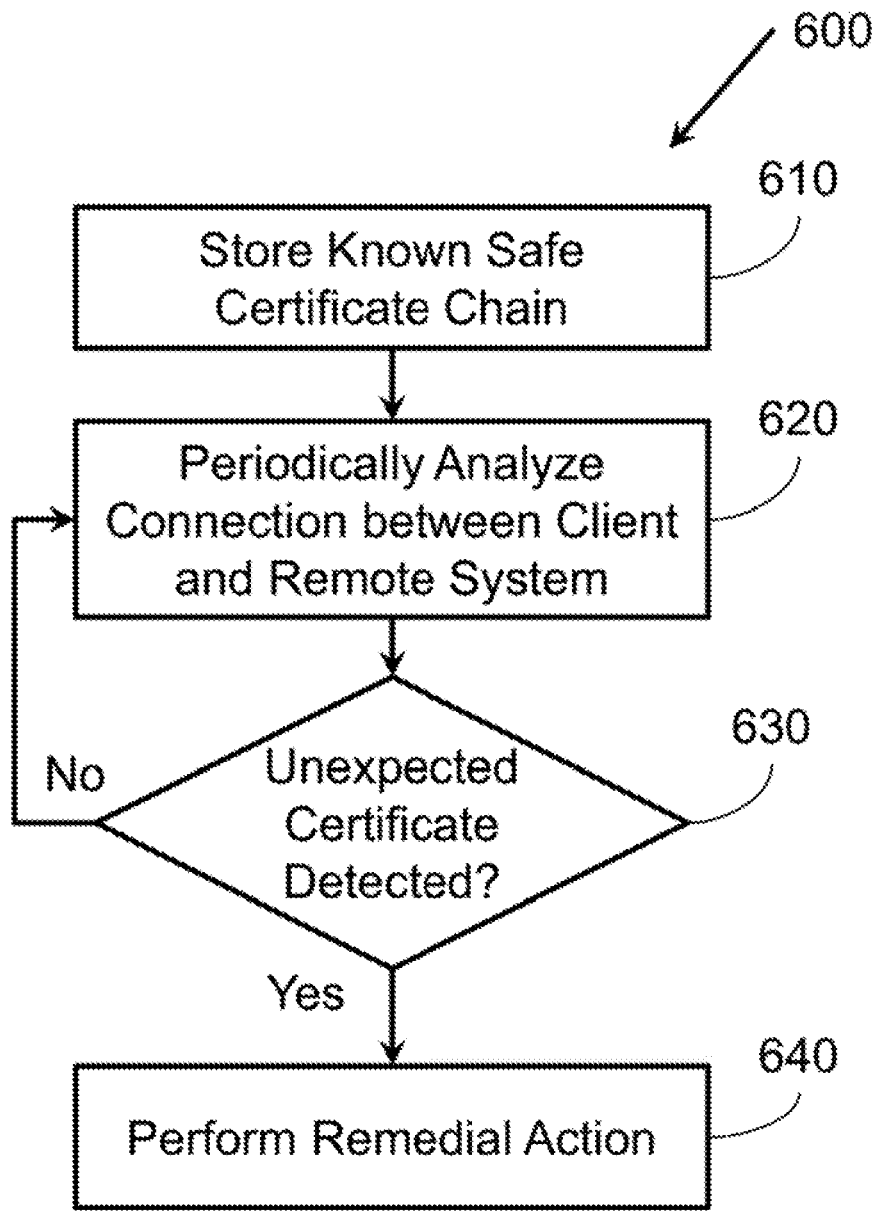
FIG. 6 illustrates another flowchart of example operations associated with certificate analysis.

FIG. 6 illustrates an example method 600 associated with certificate analysis. Method 600 may be embodied on a non-transitory computer-readable medium storing processor-executable instructions. The instructions, when executed by a client system, may cause the client system to perform method 600. In other examples, method 600 may exist within logic gates and/or RAM of an application specific integrated circuit (ASIC).

Method 600 includes storing a known safe certificate chain at 610. The known safe certificate chain may be a certificate chain associated with a connection between the client system and a remote system.

Method 600 also includes periodically analyzing a connection between the client system and the remote system at 620. The connection may be analyzed by comparing a certificate chain associated with the connection to the known secure certificate chain. The periodic analysis of the connection may occur in association with a repetitive event that characterizes the connection.

Method 600 also includes detecting whether there is an unexpected certificate in the certificate chain at 630. When no unexpected certificates are detected, method 600 proceeds to action 620 and continues periodically analyzing the connection between the client system and the remote system. If an unexpected certificate is detected at 630, method 600 proceeds to performing a remedial action at 640. The remedial action may be, for example, alerting a user, terminating the connection, securing the connection, modifying the connection, storing data related to the certificate chain, and so forth. In various examples, the remedial action may prevent a man-in-the-middle attack from adversely affecting data associated with the connection.

Figure 7:
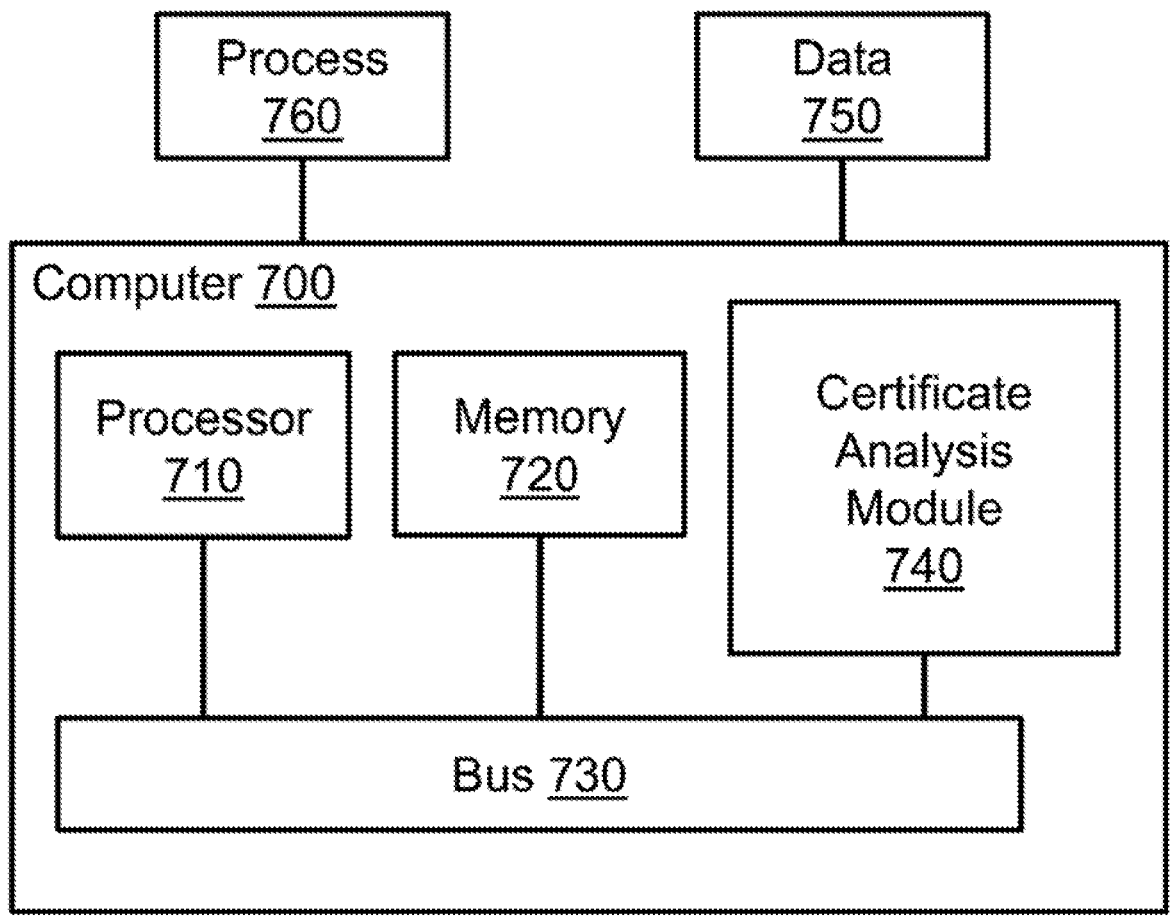
FIG. 7 illustrates an example computing device in which example systems, and methods, and equivalents, may operate.

FIG. 7 illustrates an example computing device in which example systems and methods, and equivalents, may operate. The example computing device may be a computer 700 that includes a processor 710 and a memory 720 connected by a bus 730. Computer 700 includes a certificate analysis module 740. Certificate analysis module 740 may perform, alone or in combination, various functions described above with reference to the example systems, methods, apparatuses, and so forth. In different examples, certificate analysis module 740 may be implemented as a non-transitory computer-readable medium storing processor-executable instructions, in hardware, software, firmware, an application specific integrated circuit, and/or combinations thereof.

The instructions may also be presented to computer 700 as data 750 and/or process 760 that are temporarily stored in memory 720 and then executed by processor 710. The processor 710 may be a variety of processors including dual microprocessor and other multi-processor architectures. Memory 720 may include non-volatile memory (e.g., read only memory) and/or volatile memory (e.g., random access memory). Memory 720 may also be, for example, a magnetic disk drive, a solid state disk drive, a floppy disk drive, a tape drive, a flash memory card, an optical disk, and so on. Thus, memory 720 may store process 760 and/or data 750. Computer 700 may also be associated with other devices including other computers, computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method, comprising:
    periodically analyzing, by a client device, a secure socket layer certificate chain between the client device and a server device;
    taking an action in response to detecting an unexpected certificate in the secure socket layer certificate chain;
    storing a known safe certificate chain between the client device and the server device in a data store; and
    monitoring changes to the data store and taking a remedial action in response to detecting a suspicious certificate in the data store, wherein taking the remedial action comprises enabling a virtual private network.

2. The method of claim 1, where analyzing the secure socket layer certificate chain comprises comparing the secure socket layer certificate chain to the known safe certificate chain.

3. The method of claim 1, where the action includes providing information associated with the unexpected certificate to a user.

4. The method of claim 1 where the action also includes one of initiating data protection between the client device and the server device, breaking the connection between the client device and the server device, and storing the secure socket layer certificate chain as a known safe certificate chain.

5. The method of claim 1, where the periodic analysis occurs during one of a periodic check-in by the client device to the server device, a modification to the secure socket layer certificate chain, and a modification to a known safe certificate chain.

6. A client system, comprising:
    a data store to store a set of known safe connection attributes between the client system and a server system with which the client system communicates, the set of known safe connection attributes including a known safe certificate chain;
    a connection analysis module to periodically compare connection attributes of a connection between the client system and the server system to the set of known safe connection attributes;
    a remedy module to cause the client system to take a remedial action when the connection analysis module detects an unexpected certificate in a certificate chain associated with the connection between the client system and the server system, where the unexpected certificate is a certificate absent from the known safe certificate chain; and
    a certificate analysis module to monitor changes to the data store, wherein the remedy module is to take a remedial action in response to the certificate analysis module detecting a suspicious certificate in the data store, wherein taking the remedial action comprises enabling a virtual private network.

7. The system of claim 6, where the remedy module takes a remedial action when the connection analysis module detects the connection between the client system and the server system has an attribute that falls outside the set of known safe connection attributes.

8. The system of claim 6, where the remedial action also comprises one or more of, alerting a user and performing a user directed action in response to a user input, terminating the connection between the client system and the server system, securing the connection between the client system and the server system, and modifying the set of known safe connection attributes.

9. The system of claim 8, where the server system is one or more of a client management system, a cloud-based software as a service system, a data storage system, and an internal network.

10. The system of claim 6, where the suspicious certificate is detected based on one or more of a list of known suspicious certificates and a heuristic property evaluation.

11. A non-transitory computer-readable medium storing computer-executable instructions that when executed by a client system cause the client system to:
    store a known secure certificate chain associated with a connection between the client system and a remote system in a data store;
    periodically analyze the connection between the client system and the remote system by comparing a certificate chain associated with the connection to the known secure certificate chain;
    perform a remedial action upon detecting an unexpected certificate in the certificate chain, wherein performing the remedial action comprises enabling a virtual private network; and
    monitor changes to the data store and take an additional remedial action in response to detecting a suspicious certificate in the data store.

12. The non-transitory computer-readable medium of claim 11, where the remedial action also comprises one of, alerting a user, terminating the connection, securing the connection, modifying the connection, and storing data related to the certificate chain.

13. The non-transitory computer-readable medium of claim 11, where the remedial action prevents a man-in-the-middle attack from adversely affecting data associated with the connection.

14. The non-transitory computer-readable medium of claim 11, where the periodic analysis of the connection occurs in association with a repetitive event that characterizes the connection.

\* \* \* \* \*